United States Patent
Shi et al.

(10) Patent No.: US 12,305,065 B2
(45) Date of Patent: May 20, 2025

(54) NON-LAPPING WATER-BASED WOOD STAINS

(71) Applicant: SWIMC LLC, Cleveland, OH (US)

(72) Inventors: Xiaodong Shi, Beachwood, OH (US); Maddi Ferrara, Macedonia, OH (US); Terry D. Jordan, Parma, OH (US); Joshua M. Halstead, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 644 days.

(21) Appl. No.: 17/631,935

(22) PCT Filed: Oct. 8, 2020

(86) PCT No.: PCT/US2020/054808
§ 371 (c)(1),
(2) Date: Feb. 1, 2022

(87) PCT Pub. No.: WO2021/072094
PCT Pub. Date: Apr. 15, 2021

(65) Prior Publication Data
US 2022/0282108 A1 Sep. 8, 2022

Related U.S. Application Data

(60) Provisional application No. 62/912,173, filed on Oct. 8, 2019.

(51) Int. Cl.
*C09D 15/00* (2006.01)
*C09D 7/43* (2018.01)
*C09D 175/04* (2006.01)

(52) U.S. Cl.
CPC .............. *C09D 15/00* (2013.01); *C09D 7/43* (2018.01); *C09D 175/04* (2013.01)

(58) Field of Classification Search
CPC . B27K 3/15; B27K 5/02; C09D 15/00; C09D 7/43; C09D 175/04; C09D 5/024
See application file for complete search history.

(56) References Cited

U.S. PATENT DOCUMENTS

| | | | |
|---|---|---|---|
| 4,976,782 A * | 12/1990 | Crozer | C09D 15/00 106/311 |
| 5,116,408 A | 5/1992 | Crozer | |
| 6,312,514 B1 | 11/2001 | Schulte et al. | |
| 2004/0151931 A1 | 8/2004 | Dean et al. | |
| 2008/0193785 A1 | 8/2008 | Kingma et al. | |
| 2008/0275168 A1 | 11/2008 | Schierlmann | |
| 2009/0293761 A1 | 12/2009 | Richardson et al. | |
| 2010/0048787 A1 | 2/2010 | Shapiro | |
| 2014/0194551 A1* | 7/2014 | Schaumburg | C09D 7/61 424/94.1 |
| 2015/0247023 A1 | 9/2015 | Ahrens | |
| 2018/0094157 A1 | 4/2018 | Halstead | |
| 2019/0099913 A1 | 4/2019 | Islam et al. | |
| 2020/0247000 A1 | 8/2020 | Greenberg et al. | |

FOREIGN PATENT DOCUMENTS

| | | | | |
|---|---|---|---|---|
| CA | 2336931 C | * | 9/2008 | ............ A01N 33/12 |
| CN | 101175827 A | | 5/2008 | |
| CN | 102482517 A | | 5/2012 | |
| CN | 104559597 A | * | 4/2015 | |
| WO | 2006102011 A1 | | 9/2006 | |
| WO | 2011063124 A1 | | 5/2011 | |
| WO | 2011002474 A1 | | 1/2021 | |

OTHER PUBLICATIONS

International Search Report & Written Opinion, PCT/US2020/054808, dated Apr. 12, 2022, 7 pages.
Extended European Search Report dated Sep. 29, 2023, in connection with European Patent Application No. 20875354.1 (6 pages).
Office Action issued Jan. 18, 2023 in connection with Chinese Patent Application No. 202080063879.8 (14 pages).
International Search Report and Written Opinion of International Patent Application No. PCT/US2020/054808 dated Feb. 11, 2021, 8 pages.

* cited by examiner

*Primary Examiner* — Anthony J Green
(74) *Attorney, Agent, or Firm* — Tucker Ellis LLP

(57) ABSTRACT

A wood stain composition comprises or consists essentially of a water-miscible polyol having a molecular weight less than 1000 Da, a water-dispersible hydrophobic polymer and a pigment dispersion for providing improved application properties and compliance with regulatory VOC limits.

5 Claims, No Drawings

NON-LAPPING WATER-BASED WOOD STAINS

RELATED APPLICATION

This application is the U.S. national stage application of International (PCT) Patent Application Serial No. PCT/US2020/054808, filed Oct. 8, 2020, which claims the benefit of and priority to U.S. Provisional Patent Application No. 62/912,173, filed Oct. 8, 2019, the entire disclosure of each of which is hereby incorporated by reference.

TECHNICAL FIELD

The subject matter hereof relates to staining of wood products such as hardwood floors and furniture.

BACKGROUND

Wood floors are frequently employed in quality housing and offices. The bare wood may be stained to alter its color, enabling, for example, the use of durable, damage-resistant wood whose natural color would be unsuitable for its surroundings. Stains may be oil-based or water-based. The latter offer numerous advantages such as soap-and-water cleanup, nonflammability, low odor, and minimal environmental impact. Currently, however, water-based wood stains are used primarily for small jobs. They have not been widely adopted in the flooring and large furniture sectors because they tend to exhibit various problems such as lapping, lifting, difficulty in application, and/or inconsistent appearance.

Lapping is a visual defect that occurs when applying stain to a large surface in sections. It results in a darker color in the areas where one stained section overlaps another. Lapping often results from pigment particles interacting strongly with water-based polymers, which themselves interact strongly with the wood surface. Lifting is observed when a stain is either not completely dry, or is water/solvent sensitive when a topcoat is applied thereover. This results in reduced clarity and loss of adhesion between the stain and the topcoat. Lapping and lifting properties often vary inversely, making it difficult to formulate compositions that optimize these properties.

Application difficulty often arises when staining large areas by hand using rags, as is common practice. Existing water-based stains are often sticky and require substantial effort in initially applying the stain and wiping excess away as compared with oil-based stains. Following application, it is usually found that water-based stains lack the richness and warmth of oil/solvent based stains. This results in an inconsistent appearance that resembles plastic.

Accordingly, there is a need for stains that offer the advantages of a water-based product without the disadvantages noted above.

SUMMARY

In various embodiments, a water-based stain composition in accordance herewith includes a water-based pigment dispersion and a water-miscible, low-molecular-weight (e.g., below 1000 Da) polyol that imparts lubricating properties to the composition applied to a wood surface and additionally affects the rate of penetration into the wood. In addition, the composition may include a water-dispersible hydrophobic component. In one implementation, the water-dispersible hydrophobic component includes a one-component, self cross-linking polyurethane dispersion based, for example, on one or more polyamide polyols. Compositions including the water-miscible, low-molecular-weight polyol and the water-dispersible hydrophobic component may advantageously reduce lapping and lifting, in contrast to conventional compositions that tend to favor one property at the expense of the other. In addition, compositions in accordance herewith may stratify into distinct layers during applications thereof but dry into a substantially uniform and homogeneous bulk state. Further, compositions in accordance herewith may function as humectants, extending the drying time of the stain and therefore allowing improved workability.

In some embodiments, the water-miscible, low-molecular-weight polyol includes polyethylene glycol (PEG). The PEG desirably has a molecular weight below 1000 Da. In one embodiment, the PEG compositions have a molecular weight ranging from 200 to 600 Da. In various formulations, the PEG is present at levels of approximately 30% by total formula weight, but the working range may be from 15% to 35%. Further, the molecular weight and/or formula weight of PEG in the compositions may be selected for providing low amounts of volatile organic compounds (VOCs) in the compositions, thereby in compliance with VOC worldwide regulations.

Thus, compositions including the hydrophilic polyol and the water-dispersible hydrophobic component described herein may advantageously provide improved application properties (e.g., having reduced lapping and lifting) and compliance with regulatory VOC limits.

Accordingly, in one aspect, the invention pertains to a wood stain composition including a water-miscible polyol having a molecular weight less than 1000 Da; a water-dispersible hydrophobic polymer; and a pigment dispersion. In one embodiment, the water-miscible polyol is polyethylene glycol. In addition, the polyethylene glycol may have a molecular weight of 600 Da±10%. In some embodiments, the water-dispersible hydrophobic polymer is a polyurethane dispersion, a polyester dispersion, an acrylic dispersion or an alkyd dispersion. The polyurethane dispersion may include a one-component, self cross-linking polyurethane dispersion.

In various embodiments, the composition further includes a defoamer to break foam generated during formulation processing and/or application of the composition. In addition, the composition may further include a thickener to adjust a viscosity of the composition. In one embodiment, the thickener consists essentially of hydroxyethylcellulose, hydrophobically-modified ethylene oxide-based urethanes, or hydrophobically-modified alkali soluble emulsions. Further, the composition may further include an amine. The amine may consist essentially of dimethylethanolamine, monoethylethanolamine, trimethylethanolamine, morpholine, or ammonia. In some embodiments, the composition further includes an anti-bacterial preservative to prevent degradation by microbes.

In another aspect, the invention relates to a wood stain composition consisting essentially of a water-miscible polyol having a molecular weight less than 1000 Da; a water-dispersible hydrophobic polymer; and a pigment dispersion. In one implementation, the water-miscible polyol is polyethylene glycol. In addition, the polyethylene glycol may have a molecular weight of 600 Da±10%. In some embodiments, the water-dispersible hydrophobic polymer is a polyurethane dispersion, a polyester dispersion, an acrylic dispersion or an alkyd dispersion. The polyurethane dispersion may consist essentially of a one-component, self cross-linking polyurethane dispersion.

As used herein, the term "substantially" or "approximately" means±10% (e.g., by weight or by volume), and in some embodiments, ±5%. The term "consists essentially of" means excluding other materials that contribute to function or structure. For example, colorants may be optional and do not contribute to the performance of the compositions and may be omitted; hence, it would not be excluded in a claim to compositions consisting essentially of other materials. Percentages refer to weight percentages unless otherwise indicated.

DETAILED DESCRIPTION

In various embodiments, a wood stain composition includes or consists essentially of a water-based pigment dispersion, a hydrophilic polyol and a water-dispersible hydrophobic component. The hydrophilic polyol may include or consist of, or consist essentially of, for example, PEG. The PEG may have a molecular weight below 1000 Da. In some formulations, the PEG has a molecular weight of 600 Da±10%. For example, the PEG may be CARBOWAX PEG 600, available from the Dow Chemical Company; this product has an average of 13.2 repeating oxyethylene units and an average molar weight range of 570 to 630 Da. In other embodiments, PEG compositions ranging in molecular weight from 200 to 600 Da can be used. In addition, the PEG may be present in the compositions at levels of approximately 30% by total formula weight. A working range is from 15% to 35%. The use of PEG at these levels functions well in facilitating wiping of the stain, i.e., the excess is readily wiped off, and then a water-based clearcoat may be applied thereon to provide water resistance. Stains including the PEG compositions herewith may beneficially have strong inter-coat adhesion between the stains and the clearcoats. In some embodiments, the amount of VOCs in the stain compositions is facilitated by selecting the PEG having various molecular weights and/or formula weights; as a result, the PEG compositions herewith may include low amounts of VOCs compliant with VOC worldwide regulations (or at least the standards applicable in North America).

In some embodiments, the water-dispersible hydrophobic component includes a one-component, self cross-linking polyurethane dispersion based, for example, on one or more polyamide polyols. As is well-known, polyurethane polymers are made by combining isocyanates (R—N═C═O) with polyols containing hydroxyl (—OH) functional groups to form urethane linkages. A suitable polyurethane formulation is the APTALON M8100 waterborne self-crosslinking polyurethane dispersion available from The Lubrizol Corporation. Alternative resins such as polyester, acrylic, or alkyd material—e.g., dispersed in particulate form in an aqueous (or non-aqueous) medium—may be used so long as they provide the same or comparable resistance to water and lifting. Self-crosslinking behavior is also beneficial.

The composition can be tinted using traditional water-based pigment dispersions. Working ranges are as follows:

| Raw Material | Weight Percentage |
| --- | --- |
| Deionized water | 40%-50% |
| Polyurethane | 10%-20% |
| PEG | 20%-30% |
| Thickener | 0.2%-1.0% |

-continued

| Raw Material | Weight Percentage |
| --- | --- |
| Co-solvent | 3.0%-5.0% |
| Amine | 0.2%-0.5% |
| Defoamer | 0.2%-0.5% |
| Biocide | 0.05%-0.10% |
| Colorants | 2%-5% |

The thickener is used to adjust the viscosity of the composition to a desired value. For example, an anti-settling agent (e.g., Lattice NTC-61) consisting essentially of microcrystalline cellulose may be included to reduce the shear viscosity in order to suspend pigments in the composition for long term stability. Suitable thickeners include hydroxyethylcellulose, hydrophobically-modified ethylene oxide-based urethanes, hydrophobically-modified alkali soluble emulsions, and/or other alkali-soluble associative thickeners. The amine, in turn, is used to activate the thickener. Suitable amines include dimethylethanolamine, monoethylethanolamine, trimethylethanolamine, morpholine, and/or ammonia. The defoamer is employed break foam generated during formula processing and/or application of the stain onto wood; suitable defoamers include deaerators such as AIREX 900, available from TEGO. All three of these components are optional.

A representative working formulation is as follows:

| Raw Material | Weight Percentage |
| --- | --- |
| DEIONIZED WATER | 46.7900% |
| LATTICE NTC-61 | 0.5000% |
| LOW MOL WT HEC THICKENER | 0.2000% |
| PROPYLENE GLYCOL, IND. | 0.5000% |
| DIMETHYLETHANOLAMINE-ANHYDROUS | 0.2000% |
| BYK 028 | 0.2000% |
| CARBOWAX PEG 600 85% IN WATER | 30.5700% |
| PRESERVATIVE | 0.3000% |
| APTALON M8100 | 12.9900% |
| GLYCOL ETHER DPNB | 3.0000% |
| YELLOW OXIDE | 1.5000% |
| RED IRON OXIDE | 2.5000% |
| CARBON BLACK | 1.0000% |

The order of addition of the raw materials may or may not follow the exemplary order in the table above (i.e., from the top to the bottom). For example, the deionized water may be added (i) after addition of BYK 028 and prior to addition of CARBOWAX PEG 600, (ii) after addition of APTALON M8100 and prior to addition of GLYCOL ETHER DPNB, or (iii) after addition of CARBON BLACK. In addition, the raw material(s) may be split up into several different stages of addition as long as the total weight percentage remains the same. For example, the deionized water may be split up into four different stages of addition: (i) prior to addition of LATTICE NTC-61 (as shown in the table above), (ii) after addition of APTALON M8100 and prior to addition of GLYCOL ETHER DPNB, and (iii) after addition of CARBON BLACK. In addition, the DIMETHYLETHANOLAMINE-ANHYDROUS may be split up into two different stages of addition: (i) after addition of PROPYLENE GLYCOL, IND. and prior to addition of BYK 028 and (ii) after addition of CARBON BLACK.

Suitable preservatives include ACTICIDE MV, a monovalent stabilized microbiocide, supplied by THOR, KATHON LX, an aqueous microbicide and preservative supplied by Rohm & Haas, ACTICIDE RS, a mixture of 5-chloro-2-methyl-4-isothiazolin-3-one and 2-methyl-4-isothiazolin-3-one supplied by Thor GmbH, and PREVENTOL D7, supplied by Lanxess Deutschland GmbH. BYK-024 is a VOC-free silicone-containing defoamer supplied by Byk USA Inc. NOVOCOLOR waterborne pigment dispersions, supplied by Engineered Polymer Solutions & Color Corporation of America, may be employed for the carbon black, yellow oxide, and red iron oxide components.

Accordingly, various embodiments advantageously improve the application properties of the stain compositions (e.g., having substantially reduced lapping and lifting) by including the water-miscible, low-molecular-weight (e.g., below 1000 Da) polyol and the water-dispersible hydrophobic polymer in the water-based pigment dispersions. This is in contrast to conventional compositions that tend to favor one property at the expense of the other. In addition, compositions in accordance herewith may stratify into distinct layers during applications thereof but dry into a substantially uniform and homogeneous bulk state. Further, compositions in accordance herewith may function as humectants, extending the drying time of the stain and therefore allowing improved workability.

While the invention has been described in conjunction with the specific embodiments thereof, one of ordinary skill in the art will understand that any alternatives, modifications, and variations of the types of the ingredients and/or the amounts thereof contained in the single formula finish are possible and are they within the scope of the present invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A wood stain composition consisting essentially of:
   a water-miscible polyol having a molecular weight less than 1000 Da;
   a water-dispersible hydrophobic polymer; and
   a pigment dispersion.

2. The composition of claim 1, wherein the water-miscible polyol is polyethylene glycol.

3. The composition of claim 2, wherein the polyethylene glycol has a molecular weight of 600 Da±10%.

4. The composition of claim 1, wherein the water-dispersible hydrophobic polymer is a polyurethane dispersion, a polyester dispersion, an acrylic dispersion or an alkyd dispersion.

5. The composition of claim 4, wherein the polyurethane dispersion consists essentially of a one-component, self cross-linking polyurethane dispersion.

* * * * *